May 27, 1947. A. CARLSON 2,421,115
METHOD OF SECURING LAMINATIONS ON A ROTOR SHAFT
Filed Feb. 5, 1943
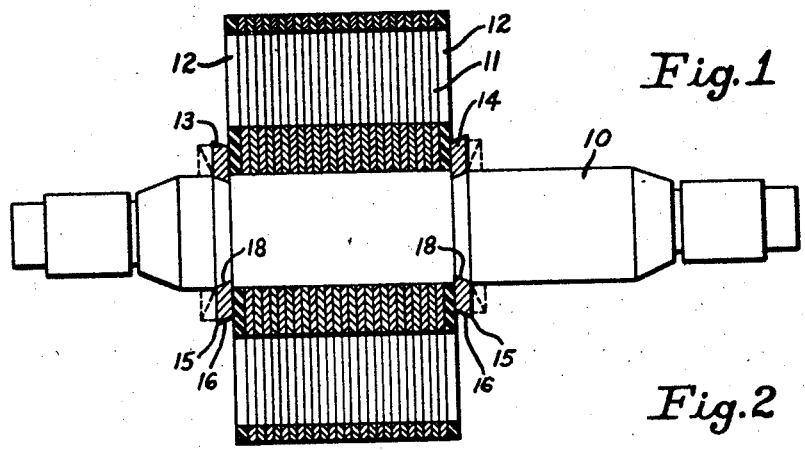
Fig. 1
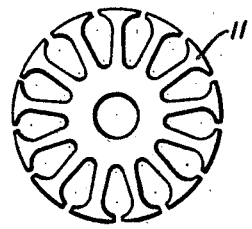
Fig. 2
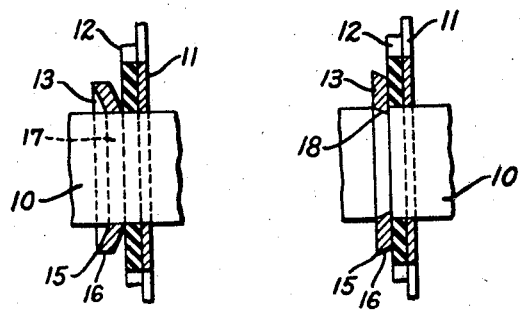
Fig. 3  Fig. 4
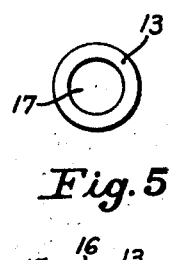
Fig. 5
Fig. 6
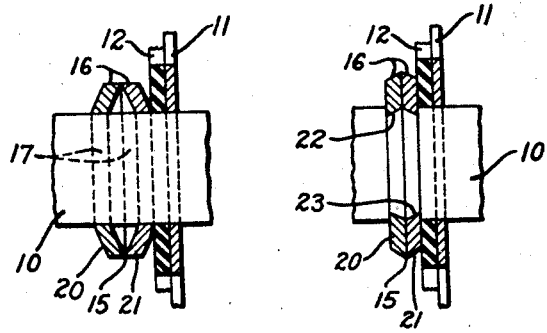
Fig. 7  Fig. 8
INVENTOR
Arnold Carlson
BY
ATTORNEY Patented May 27, 1947

2,421,115

UNITED STATES PATENT OFFICE 2,421,115

METHOD OF SECURING LAMINATIONS ON A ROTOR SHAFT

Arnold Carlson, Trumbull, Conn., assignor to Frank L. Lindstrom, Bridgeport, Conn.

Application February 5, 1943, Serial No. 474,860

1 Claim. (Cl. 29—155.53)

This invention relates to new and useful improvements in rotors for electrical apparatus and has particular relation to an improved method of securing laminations in place on a rotor shaft.

An object of the invention is to provide an inexpensive method for securing laminations in place on a rotor shaft.

Heretofore it has been the practice to secure the laminations in place on a rotor shaft either by metal washers disposed on the shaft in a flat condition at the ends of the core of laminations and manually secured to the shaft and against the respective outer laminations of the core by the use of a prick punch, or by turning the shaft down from a larger diameter and leaving an integral washer-like portion forming a shoulder at the proper place along the length of the shaft and then disposing the laminations of the core on the shaft with one outer lamination against said shoulder and then disposing a metal washer against the other outer lamination and locking it to the shaft by manual prick punch operations. In each of these cases the laminations assembled on the shaft are held tight against one another in a suitable press or the like while the punching operation securing the washer or washers to the shaft is taking place.

Another object of the invention is to provide for the securing, in the proper manner, of the laminations to a rotor shaft without turning down of the shaft to leave a shoulder and without prick punching or other manual operation for the securing of the laminations to the shaft.

Other objects and advantages will become apparent from a consideration of the following detailed description taken in connection with the accompanying drawing wherein satisfactory embodiments of the invention are shown. However, it is to be understood that the invention is not limited to the details disclosed but includes all such variations and modifications as fall within the spirit of the invention and the scope of the appended claim.

In the drawing:

Fig. 1 is a sectional view showing a rotor shaft having laminations secured thereon in accordance with the invention;

Fig. 2 is a front elevational view showing one of the laminations alone;

Fig. 3 is an enlarged detail sectional view showing the securing means of the invention in association with a portion of the rotor shaft and parts of laminations, the view being taken prior to the locking of the parts to the shaft;

Fig. 4 is a similar view but showing the parts locked;

Fig. 5 is an elevational view of the lock washer used for securing the laminations on the shaft;

Fig. 6 is a central vertical sectional view through the washer of Fig. 5;

Fig. 7 is a view similar to Fig. 3 but showing a modification; and

Fig. 8 is a view similar to Fig. 4 but showing the modified locking means of Fig. 7 in locked condition.

Referring in detail to the drawing and at first more particularly to Figs. 1 through 6 at 10 is shown a rotor shaft having a core thereon comprising a series of laminations 11 located between fibre discs 12 and all secured in place on the shaft by metal washers 13 and 14 located on the shaft and against the outer sides of the respective fibre discs 12. Washers 13 and 14 are of identical construction and their construction is shown more particularly with reference to washer 13 in Figs. 3 through 6. In these last mentioned figures it is noted that the washer 13 is cupped-shape being concavo-convex and having a narrow forward edge 15, a flat outer edge 16 and that from such edges the washer curves back to its center opening 17 which is of a diameter to receive the shaft 10 without appreciable play. Opening 17 is straight through washer 13.

In making the assembly of Fig. 1 the shaft 10 is first completed and its portion receiving the laminations and washers is of constant diameter and of the desired diameter and finish. It is cut from a bar or from bar stock and no turning is required although it may be ground to exact size and finish. Now one of the washers, as the washer 13, is located on the shaft. Next a fibre washer 12, then the laminations and a second fibre washer and finally the other washer 14 are slipped over the shaft. The actual assembly of the parts on the shaft may be varied as, for example, the laminations may be disposed on the shaft and the fibre discs and the metal washers then applied over the respective ends of the shaft. The parts may be assembled on the shaft in a suitable press or the like or the parts having been assembled on the shaft the entire assembly is placed in a press and while one washer is rigidly supported the press or other power means is operated to strike the second washer.

The blow squeezes the laminations tight together and flattens the washers against the respective ends of the laminated core. Either or both of the washers 13 and 14 may be moved inwardly slightly along the shaft 10 by the described blow and as these washers are flattened, from the condition of Fig. 3 to that of Fig. 4, the contour of their inner peripheral edges, i. e., the walls of the openings 17, is somewhat altered so that said edges are caused to dig into the shaft 10 as illustrated at 18 in Fig. 4. When the pressure of the press or other means is released the laminations having been forced together tend to open up or spring apart and exert force on the washers 13 and 14 in directions tending to move such washers apart. However, this force merely causes the washers to try to dig more into the shaft but cannot move the washers away from one another. While the action of the press or other means on the washers 13 and 14 has been described as in the nature of a blow it is to be understood that the pressure may be gradually applied although at present a sudden sharp blow seems to give preferable results.

It is to be understood that the invention comprehends the securing of various sizes or diameters of laminations to various sizes or diameters of shafts. In any given instance the cupped lock washers are made of the desired diameter and gauge of metal depending on the size of rotor structure in which they are to be employed. It will be apparent that the size, etc., of the laminations has no particular relation to the present invention and it will be understood that flat washers may be interposed between the end laminations, or the fibre discs 12, and the cupped washers 13 and 14 so that the latter are flattened against said interposed flat metal washers, if such arrangement is desired.

Referring now to the modification of Figs. 7 and 8 the shaft, fibre discs and laminations being of the structure heretofore described are identified by the same reference characters. In this modification a pair of lock washers 20 and 21 are substituted for each of the lock washers 13 and 14 of the figures first described. Washers 20 and 21 are duplicates of the washers 13 and 14. According to the modification the pair of washers at each end of the laminated core are arranged with their hollow or concave sides in opposing relation. This is as shown in Fig. 7 and when the assembly is completed these washers are flattened against one another with the inner washer of each pair flattened against the adjacent fibre end disc 12 or the adjacent end lamination if the discs 12 are not considered. Thus in the completed assembly the washers 20 and 21 are caused to bite into the shaft 10 as shown at 22 and 23 respectively in Fig. 8. That is the inner peripheral edge of the center openings of washers 20 and 21 are deformed as set forth above when considering specifically the washers 13 and 14. The use of two metal washers at each end of the laminated core as illustrated serves to give a more effective lock of the core to the shaft.

From the foregoing it will be seen that according to the present invention it is not necessary to turn down a portion of the shaft 10 to provide an integral flange against which to abut one end of the laminated core. This turning down of the shaft involved considerable expense. Further the invention eliminates any manual or hand operation such as was involved in the use of a prick punch to secure the metal washers to the shaft as was the practice heretofore. With the present invention there is considerable saving of time and labor and the laminations are very securely held in place on the rotor shaft.

Prior to flattening the washers 13 and 14 of Figs. 1 through 4 and 21 of Figs. 7 and 8 have their convex sides against the laminated core. When the pressure is applied and the laminations are packed tight the outer portions of the washers are pressed back against the laminations and the portions of the edges of openings 17 toward the laminations are contracted and bite into the shaft. That is on flattening of the washers the opening 17 becomes somewhat tapered being of reduced diameter toward that side of the washer that formerly was convex. There is no tendency to roll the edges of the opening 17 as during the flattening of the washers their portions about the openings 17 are stationary or substantially so in that they are against the packed laminations and are not moved in the direction of the length of the shaft. In Figs. 7 and 8 the washers 20 face opposite to washers 21 and when flattened bite into the shaft in a manner to brace washers 21 against any movement longitudinally of the shaft.

Having thus set forth the nature of my invention, what I claim is:

The method of securing laminations in place on a rotor shaft comprising disposing a pair of cupped-shaped metal washers on the shaft at each end of the core of laminations, arranging the washers of the pairs with their concave sides facing one another at the respective ends of the core, and then flattening the washers of the pairs against one another and the inner washer of each pair against the adjacent end of the core causing the inner peripheral edges of the washers to contract and dig into the shaft and thereby anchor the washers to the shaft against the ends of the core to secure the latter in place on the shaft.

ARNOLD CARLSON.

REFERENCES CITED

The following references are of record in the file of this patent:

UNITED STATES PATENTS

| Number | Name | Date |
| --- | --- | --- |
| 1,192,404 | Ewart | July 25, 1916 |
| 1,467,938 | Janette | Sept. 11, 1923 |
| 1,156,279 | Duke | Oct. 12, 1915 |
| 1,213,509 | Lee | Jan. 23, 1917 |
| 2,058,452 | Hoffman | Oct. 27, 1936 |
| 1,460,749 | Dull | July 3, 1923 |
| 1,467,938 | Janette | Sept. 11, 1923 |